No Printed Specification Available
6772X
J. Y. Van Tuyl,
Wind Wheel.
Patented Sep. 28, 1831.
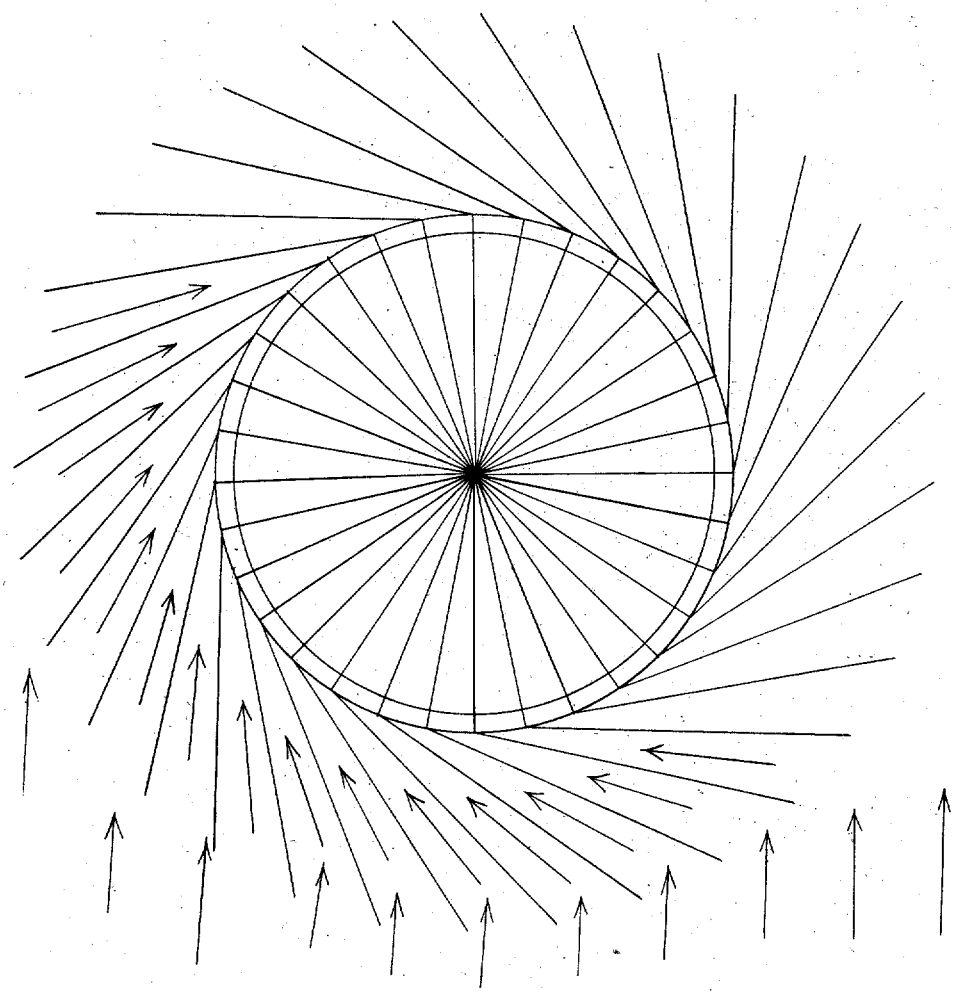
N. PETERS, PHOTO-LITHOGRAPHER, WASHINGTON, D. C.

John Y. Van Zuyl 6772X
Letters Patent

The Schedule referred to in these Letters Patent, and making part of the same, containing a description in the words of the said John Y. Van Zuyl himself, of his Improvement in the application of the Power of Wind to Mills. Factories. Boats or vessels. Pumps and all kinds of Machinery.

To all to whom these presents shall come:
Be it known that I, John Y. Van Zuyl of Rahway in the County of Essex and State of New Jersey, have invented a new and useful improvement in the application of the power of Wind, applicable to Mills. Factories. Boats or vessels, Pumps and all kinds of Machinery requiring power, and that the following is a full and exact description of the construction and operation of the said improvement as invented by me (a drawing of which ....is annexed) viz.

In the centre is an upright shaft running on a point in the ordinary manner. The wheel is made as common water wheels with the Buckets outside of the rims, and of course runs horizontally. The red line is intended to represent an open space just wide enough for the buckets to clear the ends of the funnel boards. The funnels are represented by the angular lines drawn around the wheel, and are made permanently fast on a circular floor of sufficient width for the length of the funnel. The buckets or propelling boards are secured to the wheel at right angles with the wheel, of any required length outside the rims, on which the wind acts, being driven thro' the funnels and discharged on the buckets at the throat of the funnels where it is compressed and acquires a greatly increased force. The rim of the wheel must be as broad as the buckets are long and made tight to prevent the wind escaping 128. 9/20/1831 6772X ing into the wheel. The buckets are straight pieces of boards set with a small inclination to receive the wind direct from the throat of the funnels. The funnels must be as deep perpendicularly at the throat as the length of the buckets and all placed on the same angle from the rim of the wheel, and covered with a cover corresponding with the floors. The size of the mouths of the funnels will be in proportion to the length of the funnels, which can be regulated according to the work or resistance required to be overcome and the power can be increased to any desired extent. Doors must be hung at the mouth of every funnel, for the purpose of closing as many of the funnels as may be necessary, when the wind is too strong to open back against a cleat at top and bottom, and can be opened or shut by a cord or chain leading through pulleys or blocks into the Mill &c, and the motion of the wheel thereby regulated at pleasure, in connexion with a Governor & friction bands. The Invention I claim is the improved manner above described for applying the power of Wind to Mills &c – which I believe to be original Witnessed
Amos Morse
W. H. Cleaver John Y. Van Zuyl

64P
WGC

440 [illegible]

(Rec^d June 5. 1837 & Recorded anew)